United States Patent
Fan et al.

(10) Patent No.: US 8,381,495 B2
(45) Date of Patent: Feb. 26, 2013

(54) GEL MAT AND METHOD FOR MANUFACTURING THE SAME

(75) Inventors: Litao Fan, Shanghai (CN); Xuebing Zhu, Shanghai (CN)

(73) Assignees: Hirakawa Corporation, Tokyo (JP); Litao Fan, Shanghao (CN)

( * ) Notice: Subject to any disclaimer, the term of this patent is extended or adjusted under 35 U.S.C. 154(b) by 743 days.

(21) Appl. No.: 12/458,320

(22) Filed: Jul. 8, 2009

(65) Prior Publication Data

US 2010/0009128 A1    Jan. 14, 2010

(30) Foreign Application Priority Data

Jul. 9, 2008 (CN) .......................... 2008 1 0063081

(51) Int. Cl.
*B65B 63/08* (2006.01)

(52) U.S. Cl. ................. 53/428; 53/469; 53/524; 5/655.5

(58) Field of Classification Search ............ 53/428, 53/521, 524, 469; 5/417, 420, 676, 655.5, 5/909

See application file for complete search history.

(56) References Cited

U.S. PATENT DOCUMENTS

| | | | | |
|---|---|---|---|---|
| 3,187,069 A | * | 6/1965 | Pincus et al. | 264/46.8 |
| 3,663,973 A | * | 5/1972 | Spence | 528/15 |
| 3,689,948 A | * | 9/1972 | Graves et al. | 524/379 |
| 3,932,252 A | * | 1/1976 | Woods | 156/245 |
| 4,377,609 A | * | 3/1983 | Bartoli et al. | 428/71 |
| 5,372,877 A | * | 12/1994 | Kannankeril | 428/311.71 |
| 5,918,334 A | * | 7/1999 | Laidlaw | 5/654 |
| 6,386,850 B1 | * | 5/2002 | Salerno et al. | 425/112 |

FOREIGN PATENT DOCUMENTS

CN             200994613           12/2007

* cited by examiner

*Primary Examiner* — Thanh Truong
(74) *Attorney, Agent, or Firm* — Wenderoth, Lind & Ponack, L.L.P.

(57) ABSTRACT

The present invention discloses a gel mat and a method for manufacturing the same. The purpose thereof is to provide a gel mat which features simple manufacturing process, low cost, ease of use, high reliability, and freedom from possible damage in case of being pierced or depressed with a pressure, and a method for manufacturing the same. The gel mat includes a hermetically sealed bag which is constituted by two layers of a film material, the bag being packed with gel flakes. Said method for manufacturing a gel mat comprises the steps of preparation of material, bag making, monomer solution pouring, heating for solidification, and inspection and packaging in this order. The present invention adopts a gel instead of water, which is conventionally used, for producing a flake gel mat the external surfaces of which are inside a bag; the gel is a colloid obtained by polymerizing the organic matter; approx. 70% of the gel is constituted by water; and thus the gel mat has an extremely good endothermic performance. In addition, the gel offers no flowability like water, being able to be stably used, and even when the bag is broken through by a pointed substance or burst out to be holed, there will cause no leakage, which allows the service life of the mat to be substantially extended. The method for manufacturing uses polymerization reaction; smoothes the gel mat flat inside the bag by applying an external pressure; and thus can provide a finished gel mat which has smooth and neat outer surfaces.

14 Claims, 2 Drawing Sheets

A) Preparing the Film Material

B) Making the Bag

C) Pouring a Monomer Solution

D) Heating to Solidify the Monomer Solution

E) Inspecting and Packaging the Gel Mat

GEL MAT AND METHOD FOR MANUFACTURING THE SAME

TECHNICAL FIELD

The present invention relates to a mat element, and particularly to a gel mat and a method for manufacturing the same.

BACKGROUND ART

Nowadays, water mats are commercially available for use in daily life, and when a water mat is laid on a bed, sofa, or the like, it not only gives comfort, but also works as a tool for physical therapy. Such a water mat generally has a hermetically sealed cavity constituted by two layers of a film material, and into the cavity, water is injected to form a water mat. In some of the conventional water mats, a heater or cooler is installed in the cavity for heating or cooling the water to provide a hot or cold compress. Examples include a super conductive warm water mat as disclosed in Patent document 1. However, in service, the water mat may be broken through, being pierced by a pointed substance, or burst open, being depressed with a large pressure, resulting in the cavity leaking, which makes the water mat unusable, thus the water mat generally has a short service life. In addition, because of the flowability of water, the water mat has a slightly poor stability, and gives an uncomfortable feeling of rocking.

CITATION LIST

Patent Literature

Patent Literature 1: Chinese Utility Model No. 200720002744.2 Specification

SUMMARY OF INVENTION

It is an object of the present invention to overcome the drawbacks of existing products by providing a gel mat which features simple manufacturing process, low cost, ease of use, high reliability, and freedom from possible damage in case of being pierced or depressed with a pressure, and a method for manufacturing the same.

Technical Problem

The present invention has achieved the aforementioned object by the following technological method. In other words, the gel mat includes a hermetically sealed bag which is constituted by two layers of a film material, the bag being packed with gel flakes.

Solution to Problem

The aforementioned method for manufacturing a gel mat comprises the following steps A to E:

A) Preparation of material: a step of cutting a film material to the outside dimensions of the gel mat and on the material conditions;

B) Bag making: a step of opposing two film materials having a plastic layer to each other for heating the plastic layer to fuse the surfaces of the two film materials for producing a bag from the opposed two film materials that is hermetically sealed at the periphery except for a portion to be used as an injection port;

C) Pouring monomer solution: a step of intermixing water, a monomer, a crosslinking agent, and an initiator to give a monomer solution, pouring the monomer solution into the bag from the injection port, and then closing the injection port;

D) Heating for solidification: a step of placing the bag, into which the monomer solution has been poured, flat on a heater for heating it to thoroughly polymerize the monomer solution in the bag for generating a flake polymer, i.e., a gel; and E) Inspection and packaging: a step of inspecting the processing quality, and packaging an inspection-passed product for storing it in a warehouse.

Advantageous Effects of Invention

The aforementioned method for manufacturing a gel mat adopts a gel instead of water, which is conventionally used, for producing a flake gel mat the external surfaces of which are inside a bag; the gel is a colloid obtained by polymerizing the organic matter; approx. 70% of the gel is constituted by water; and thus the gel mat has a high thermal capacity close to that of water. Therefore, like the water mat, the gel mat has an extremely good endothermic performance. In addition, the gel offers no flowability like water, being able to be stably used, and even when the bag is broken through by a pointed substance or burst out to be holed, there will cause no leakage, which allows the service life of the mat to be substantially extended. The method for manufacturing uses polymerization reaction; smoothes the gel mat flat inside the bag by applying an external pressure; and thus can provide a finished gel mat which has smooth and neat outer surfaces.

DESCRIPTION OF EMBODIMENTS

Further, embodiments of the present invention will be described with reference to the drawings.

Example 1

Figure 1:
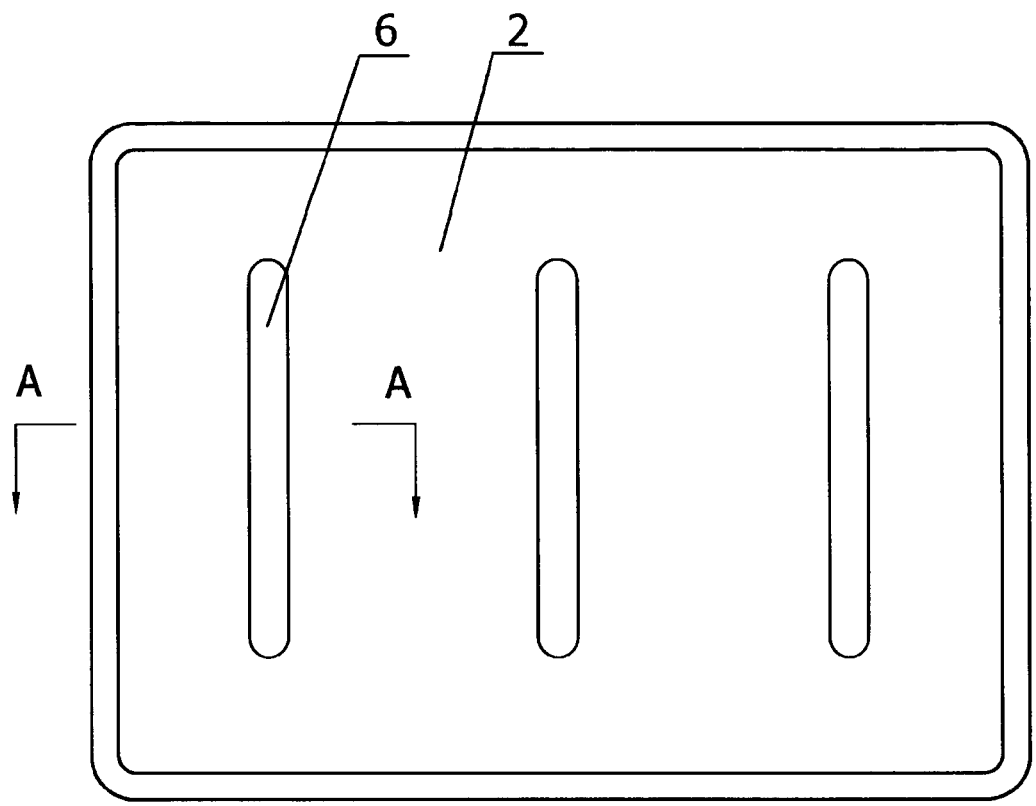
FIG. 1 is a front view of a gel mat.
Figure 2:
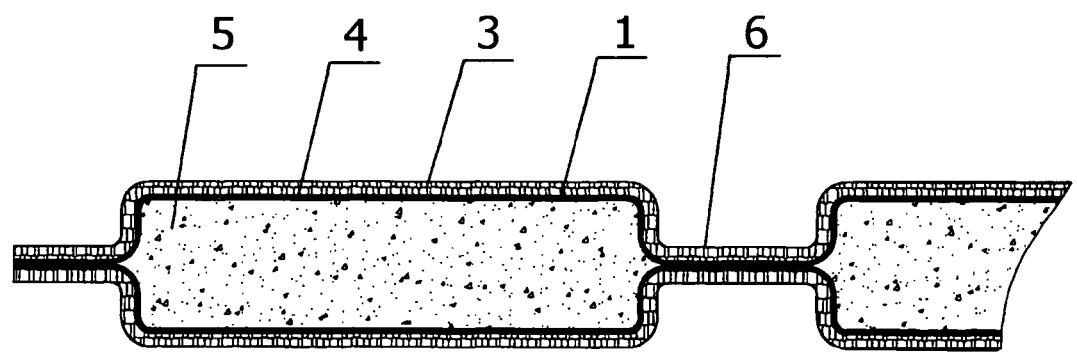
FIG. 2 is a sectional view along the line A-A in FIG. 1
Figure 3:
FIG. 3 is a flow chart of the method of manufacturing a gel mat according to steps A) to E).
Figure 3:
Figure 3:
Figure 3:

FIG. 1 and FIG. 2 are schematic drawings illustrating the structure of a gel mat. The gel mat includes a bag 2 which is constituted by two layers of a film material 1, being hermetically sealed, said film material 1 being produced by coating a fabric cloth or flock cloth 3 with plastic to provide two layers of different materials, and by folding the film material 1, a plastic layer 4 being formed as an internal layer of the bag 2. Said fabric cloth is a cotton cloth or a chemical fiber cloth, or a mixed spun cloth of a cotton fiber and a chemical fiber. Examples of a chemical fiber cloth used include nylon taffeta. The plastic as mentioned above is a PVC, PE, PU or TPU material, and generally the plastic layer 4 has a thickness of 0.05 mm to 0.45 mm. The monomer solution in the bag 2 is subjected to a polymerization reaction to generate a polymer gel 5, forming a flake gel 5 in the bag. The thickness of the gel 5 is generally 0.8 mm to 5 mm. In case where the bag 2 has a large area, the two layers of the film material 1 have a large separation area, there occurring a possibility of the gel 5 being migrated, and in order to prevent such a possible migration, a single or several reinforcements 6 may be provided in locations inside the bag 2 by directly sticking the two layers of the film material 1 to each other when the bag 2 is manufactured. By doing this way, the gel mat can be conveniently folded at the location where the reinforcement 6 is produced, and it is also useful for ventilation in service.

The aforementioned method for manufacturing a gel mat comprises the following steps A to E:

A) Preparation of material: In this step, a film material 1 is selected and cut to the outside dimensions of the gel mat and on the material conditions. Before cutting the film material 1 or after cutting it to the desired dimensions, the film material 1 may be heated at a heating temperature of 100 deg C. to 200 deg C. for a heating time period of 5 seconds to 30 seconds, depending upon the output of the heater, and the production efficiency. For example, if the film material 1 is preshrunk at a heating temperature of 150 deg C. for a heating time period of 15 seconds, the gel mat will be finished flat.

B) Bag making: two film materials 1 having a plastic layer 4 on one side are opposed to each other for heating the plastic layer 4 to fuse the surfaces of the two film materials 1 for producing a bag 2 from the opposed two film materials 1 that is hermetically sealed at the periphery except for a portion to be used as an injection port. Depending upon the size of the bag 2, a single or several reinforcements 6 may be provided in locations inside the bag 2 by directly sticking the two layers of the film material 1 to each other.

C) Pouring monomer solution: water, a monomer, a crosslinking agent, and an initiator, to which a pigment and/or a flavoring agent may be added, are intermixed to give a monomer solution, and the monomer solution is poured into the bag 2 from the injection port, and then closing the injection port. In case where air has been introduced into the bag 2 during the pouring, the air must be removed without fail before closing the injection port.

Said monomer is a water soluble monomer, such as one type or a combination of two or more types selected from the group consisting of acrylic acid and alkali metal salts thereof, methacrylic acid and metal salts thereof, acrylic acid generating esters, and the like, for use in manufacturing of a highly water-absorbing polyacrylic acid resin, or otherwise a monomer, such as acrylamide, methacrylamide, or the like, for use in manufacturing of a highly water-absorbing polyacrylamide resin, or otherwise a combination of the aforementioned two different types of monomers.

Said crosslinking agent is a compound having a non-conjugated double bond, such as a divinyl or trivinyl compound; a polyester derived from an unsaturated monocarboxylic acid or polyvalent carboxylic acid and a polyhydric alcohol, or the like; a diacrylamide; or a diether or polyether of a polyhydric alcohol; or otherwise an alkaline-earth metal compound; a polyvalent metal compound such as a zincide, ferride, alminide, or the like; or otherwise a compound, such as an acrylic acid glycidyl ester, ethylene glycol, ethylenediamine, ethylene glyoxal, a phenylacetic acid, or the like.

Said initiator is constituted by a thermal initiator, such as a peroxide, an azo compound, or the like, or a redox initiator having any combination of substances selected from the group consisting of hydrogen peroxide, isopropyl benzene hydrogen peroxide, ammonium persulfate, potassium persulfate, and the like, and the group consisting of F2+ salts, sulfites, thiosulfates, mono(poly)valent amines, hydrazine sulfinates, and the like, and optionally contains a slight amount of a metallic compound, such as cerium ammonium nitrate, iron trichloride, a 5-valent alumina salt, or the like.

The weight percentages occupied by said water, monomer, crosslinking agent, initiator are 60% to 80% for said water, 10% to 30% for said monomer, 0.1% to 6% for said crosslinking agent, and 0.1% to 6% for said initiator.

D) Heating for solidification: the bag 2, into which the monomer solution has been poured, is placed flat on a heater for heating it generally at a heating temperature of 50 deg C. to 80 deg C. for thoroughly polymerizing the monomer solution in the bag 2 to generate a flake polymer, i.e., a gel 5. Said heater is a piece of equipment which uses pneumatic or hydraulic pressure to press a two-layer or multi-layer heat panel in a freely elevatable manner at a temperature which can be adjusted between 30 deg C. to 100 deg C. as required. The bag 2 is sandwiched between the heat panels to be heated and pressurized.

E) Inspection and packaging: the processing quality is inspected, and an inspection-passed product is packaged to be stored in a warehouse.

REFERENCE SIGNS LIST

1: Film
2: Bag
3: Fabric cloth or flock cloth
4: Plastic layer
5: Gel
6: Reinforcement

The invention claimed is:

1. A method for manufacturing a gel mat comprising a hermetically sealed bag comprising two layers of a film material, wherein the bag comprises polymer gel flakes, said method comprising the following steps A to E:

A) Preparing the film material: a step of cutting the film material to correspond to a desired dimension of the gel mat;

B) Making the bag: a step of contacting the two layers of the film material by applying a plastic layer to the two layers of the film material and heating the plastic layer to fuse the two layers of the film material to obtain the hermetically sealed bag, except for a portion to be used as an injection port;

C) Pouring a monomer solution: a step of intermixing water, a monomer, a crosslinking agent, and an initiator selected from group consisting of (i) a thermal initiator, optionally with a metallic compound, and (ii) a redox initiator, optionally with a metallic compound, to obtain a monomer solution, pouring the monomer solution into the bag through the injection port, and then closing the injection port, wherein the thermal initiator is selected from the group consisting of a peroxide compound and an azo compound;

D) Heating to solidify the monomer solution: a step of placing the bag, into which the monomer solution has been poured in step C, flat on a heater and heating it to polymerize the monomer solution in the bag and generate the polymer gel flakes to produce the gel mat; and E) Inspecting and packaging the mat: a step of inspecting the obtained gel mat of steps A to D, and then packaging an inspection-passed gel mat and storing it in a warehouse.

2. The method for manufacturing the gel mat according to claim 1, wherein, in step A, either before cutting the film material or after cutting the film material to the desired dimension, the film material is preshrunk by heating at a heating temperature of 100° C. to 200° C. for a heating time period of 5 seconds to 30 seconds.

3. The method for manufacturing the gel mat according to claim 1, wherein the step of intermixing further comprises intermixing a pigment and/or a flavoring agent into the monomer solution.

4. The method for manufacturing the gel mat according to claim 1, wherein the monomer in step C is a water soluble monomer for use in manufacturing of a polyacrylic acid highly water-absorbing resin, or a monomer for use in manufacturing of a polyacrylamide highly water-absorbing material.

5. The method for manufacturing the gel mat according to claim 4, wherein the water soluble monomer for use in the manufacturing of the polyacrylic acid highly water-absorbing resin is one type or a combination of two or more types selected from the group consisting of acrylic acid and alkali metal salts thereof, methacrylic acid and metal salts thereof, methacrylic acid generating esters and acrylic acid generating esters.

6. The method for manufacturing the gel mat according to claim 4, wherein the monomer for use in the manufacturing of the polyacrylamide highly water-absorbing resin is acrylamide and/or methacrylamide.

7. The method for manufacturing the gel mat according to claim 1, wherein the crosslinking agent in step C is selected from the group consisting of a compound having a non-conjugated double bond, a polyvalent metal compound, an acrylic acid dehydrated glycidyl ester, ethylene glycol, ethylenediamine, ethylene glyoxal and phenylacetic acid.

8. The method for manufacturing the gel mat according to claim 7, wherein the compound having the non-conjugated double bond is selected from the group consisting of a divinyl compound a trivinyl compound, a polyester derived from an unsaturated monocarboxylic acid, a polyester derived from a polyvalent carboxylic acid and a polyhydric alcohol, a diether of a polyhydric alcohol and a polyether of a polyhydric alcohol.

9. The method for manufacturing the gel mat according to claim 7, wherein the polyvalent metal compound is an alkaline-earth metal compound, zincide, ferried, or alminide.

10. The method for manufacturing the gel mat according to claim 1, wherein the initiator includes the metallic compound.

11. The method for manufacturing the gel mat according to claim 10, wherein the metallic compound is cerium ammonium nitrate, iron trichloride, or a 5-valent alumina salt.

12. The method for manufacturing the gel mat according to claim 1, wherein the redox initiator is (i) any combination of substances selected from the group consisting of hydrogen peroxide, isopropyl benzene hydrogen peroxide, ammonium persulfate and potassium persulfate, or (ii) a substance selected from the group consisting of a F2+ salt, a sulfite, a thiosulfate, a mono(poly)valent amine and a hydrazine sulfinic acid.

13. The method for manufacturing the gel mat according to claim 1, wherein the heater is a piece of equipment which uses pneumatic or hydraulic pressure to press a two-layer or multi-layer heat panel in a freely elevatable manner at a temperature which can be adjusted between 30° C. to 100° C., as required.

14. The method for manufacturing the gel mat according to claim 1, wherein the weight percentages occupied by the water, monomer, crosslinking agent and initiator are: 60% to 80% for the water, 10% to 30% for the monomer, 0.1% to 6% for the crosslinking agent, and 0.1% to 6% for the initiator.

* * * * *